(12) United States Patent
McGee et al.

(10) Patent No.: US 10,905,997 B2
(45) Date of Patent: Feb. 2, 2021

(54) MOISTURE SEPARATION SYSTEM

(71) Applicant: Carrier Corporation, Farmington, CT (US)

(72) Inventors: Randolph Carlton McGee, Hamden, CT (US); Parmesh Verma, South Windsor, CT (US); Thomas D. Radcliff, Vernon, CT (US); Zissis A. Dardas, Worcester, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 240 days.

(21) Appl. No.: 16/074,064

(22) PCT Filed: Jan. 25, 2017

(86) PCT No.: PCT/US2017/014889
§ 371 (c)(1),
(2) Date: Jul. 30, 2018

(87) PCT Pub. No.: WO2017/132231
PCT Pub. Date: Aug. 3, 2017

(65) Prior Publication Data
US 2019/0039017 A1  Feb. 7, 2019

Related U.S. Application Data

(60) Provisional application No. 62/288,282, filed on Jan. 28, 2016.

(51) Int. Cl.
*B01D 53/26* (2006.01)
*F24F 3/14* (2006.01)
(Continued)

(52) U.S. Cl.
CPC .......... *B01D 53/263* (2013.01); *B01D 45/16* (2013.01); *B01D 46/0031* (2013.01);
(Continued)

(58) Field of Classification Search
CPC .. B01D 53/1425; B01D 53/263; B01D 53/28; B01D 45/16; F24F 3/1411; F24F 3/1417
See application file for complete search history.

(56) References Cited

U.S. PATENT DOCUMENTS 4,180,985 A * 1/1980 Northrup, Jr. ........ F24F 3/1423
62/94
4,905,479 A   3/1990 Wilkinson
(Continued)

FOREIGN PATENT DOCUMENTS

WO   2006074383 A2   7/2006
WO   2011150081 A3   4/2012
(Continued)

OTHER PUBLICATIONS

ISR/WO, Issued Jun. 12, 2017, U300759PCT.
Dieckmann, et al., "Liquid Desiccant Air Conditioners," ASHRAE Journal, Apr. 2004; pp. 58-59.

*Primary Examiner* — Renee Robinson
(74) *Attorney, Agent, or Firm* — Cantor Colburn LLP

(57) ABSTRACT

A moisture removal system for removing moisture from a gas is disclosed including a water absorption vessel with a microemulsion. The system also includes a gas-liquid phase separator in fluid communication with a water absorption vessel gas outlet, a gas outlet for conditioned air in fluid communication with a conditioned space, and a liquid outlet. An optional heat exchanger heats used microemulsion from the water absorption for water desorption in a water desorption vessel. An optional microemulsion regenerator provides thermal regeneration of microemulsion from the water desorption vessel for returning regenerated microemulsion to the water absorption vessel.

18 Claims, 7 Drawing Sheets

(51) Int. Cl.
- *B01D 53/28* (2006.01)
- *B01D 45/16* (2006.01)
- *B01D 53/14* (2006.01)
- *B01D 46/00* (2006.01)
- *B01D 50/00* (2006.01)

(52) U.S. Cl.
CPC ....... *B01D 50/002* (2013.01); *B01D 53/1425* (2013.01); *B01D 53/28* (2013.01); *F24F 3/1411* (2013.01); *F24F 3/1417* (2013.01); *B01D 2239/0695* (2013.01); *B01D 2252/205* (2013.01); *B01D 2275/10* (2013.01); *B01D 2279/50* (2013.01)

(56) References Cited

U.S. PATENT DOCUMENTS

| | | | |
|---|---|---|---|
| 4,941,324 A * | 7/1990 | Peterson | F24F 3/1411 62/271 |
| 4,984,434 A | 1/1991 | Peterson et al. | |
| 5,151,198 A | 9/1992 | McCullough, Jr. et al. | |
| 5,534,186 A | 7/1996 | Walker et al. | |
| 5,943,874 A | 8/1999 | Maeda | |
| 6,216,483 B1 | 4/2001 | Potnis et al. | |
| 8,141,379 B2 | 3/2012 | Al-Hadhrami et al. | |
| 8,943,844 B2 | 2/2015 | Forkosh | |
| 2005/0109209 A1 | 5/2005 | Lee | |
| 2014/0150481 A1 | 6/2014 | Vandermeulen | |
| 2014/0366567 A1 | 12/2014 | Vandermeulen | |

FOREIGN PATENT DOCUMENTS

| | | | | |
|---|---|---|---|---|
| WO | 2015026830 A1 | | 2/2015 | |
| WO | 2015143155 A1 | | 9/2015 | |
| WO | WO 2015/166101 | * | 11/2015 | ............... F24F 3/14 |
| WO | 2017132231 A1 | | 8/2017 | |

* cited by examiner

MOISTURE SEPARATION SYSTEM

CROSS-REFERENCE TO RELATED APPLICATIONS

This is a national stage of PCT/US2017/01488 filed on Jan. 25, 2017, which claims the benefit of priority to U.S. Provisional Patent Application Ser. No. 62/288,282, filed Jan. 28, 2016, the disclosure of which is incorporated herein by reference.

BACKGROUND

Moisture can be separated or removed from a gas for various purposes such as industrial processes or air conditioning.

For example, conventional vapor compression air conditioning (VCC) systems generally do not provide direct control of humidity of conditioned air. However, humidity control is often required, and is provided with VCC systems by direct expansion of refrigerant to a temperature below the dew point of the air being conditioned. This results in condensation of atmospheric moisture at the VCC system evaporator. Air flowing across the evaporator coils is typically at or near the saturation temperature for a given pressure and is colder than the temperature needed for conditioned air, and is often re-heated to provide conditioned air at desired temperature and humidity levels.

BRIEF DESCRIPTION

In some embodiments of this disclosure, a moisture separation system comprises a water absorption vessel comprising a microemulsion disposed therein. The water absorption vessel also comprises a gas inlet in fluid communication with a gas source of gas comprising moisture to be removed and a gas outlet. The system also includes a gas-liquid phase separator comprising an inlet in fluid communication with the water absorption vessel gas outlet, a gas outlet for dried gas, and a liquid outlet.

In some embodiments, a method of separating moisture from a gas comprises contacting the gas with a microemulsion to absorb water from the gas into the microemulsion, producing dehumidified gas and used microemulsion. Microemulsion carried over in the dehumidified gas is separated from the dehumidified gas with a gas-liquid phase separator to produce dried gas. In some optional embodiments, the used microemulsion is heated to form a modified used microemulsion and non-emulsified water, and the non-emulsified water is separated to form a regenerated microemulsion, which is recycled for contact with the gas.

In any of the foregoing embodiments, the phase separator comprises a centrifugal phase separator.

In any of the foregoing embodiments, the phase separator comprises a liquid droplet capture medium.

In any of the foregoing embodiments, the liquid droplet capture medium comprises a mesh pad with a mesh size of 0.1 μm to 10 μm.

In any of the foregoing embodiments, the liquid droplet capture medium comprises a plurality of mesh pads separated by barrier layers.

In any of the foregoing embodiments, the phase separator comprises a liquid micro-droplet coalescing medium.

In any of the foregoing embodiments, the liquid micro-droplet coalescing medium comprises a micro-fiber filter medium with a mesh size of 0.1 μm to 10 μm.

In any of the foregoing embodiments, the phase separator comprises a centrifugal phase separator, a liquid droplet capture medium, and a liquid micro-droplet coalescing medium.

In any of the foregoing embodiments, pressure at the gas outlet of the gas-liquid phase separator differs from pressure at the inlet of the gas-liquid phase separator by less than or equal to 50% of the pressure at the inlet of the gas-liquid phase separator.

In any of the foregoing embodiments, pressure at the gas outlet of the gas-liquid phase separator differs from pressure at the inlet of the gas-liquid phase separator by less than or equal to 10% of the pressure at the inlet of the gas-liquid phase separator.

In any of the foregoing embodiments, pressure at the gas outlet of the gas-liquid phase separator differs from pressure at the inlet of the gas-liquid phase separator by less than or equal to 2% of the pressure at the inlet of the gas-liquid phase separator.

In any of the foregoing embodiments, the system further comprises a used microemulsion heat exchanger comprising a heat absorption side inlet in fluid communication with a water absorption vessel liquid outlet, and a heat absorption side outlet. The system also includes a water desorption vessel comprising an inlet in fluid communication with the used microemulsion heat exchanger heat absorption side outlet, a water outlet, and a microemulsion outlet. The system also includes a microemulsion regenerator for thermal regeneration of microemulsion from the water desorption vessel. The microemulsion regenerator comprises a regenerator inlet in fluid communication with the water desorption vessel microemulsion outlet, and a regenerator outlet in fluid communication with a water absorption vessel microemulsion inlet.

In any of the foregoing embodiments, the system further comprises a microemulsion recycle stream for a portion of the regenerated microemulsion from the microemulsion regenerator outlet to the microemulsion heat absorption side inlet.

In any of the foregoing embodiments, the system further comprises a regenerated microemulsion heat exchanger comprising a heat rejection side inlet in fluid communication with the microemulsion regenerator outlet and a heat rejection side outlet in fluid communication with the water absorption vessel microemulsion inlet.

In any of the foregoing embodiments, the gas comprising moisture to be removed is outside air, and the gas outlet of the gas-liquid phase separator is in fluid communication with a conditioned space.

In any of the foregoing embodiments, the system further comprises a vapor compression cooling system comprising a refrigerant in thermal communication with the conditioned space. In some embodiments, the refrigerant is also in thermal communication with the microemulsion.

In some embodiments of this disclosure, an air conditioning system comprises a water absorption vessel comprising a microemulsion disposed therein. The water absorption vessel also comprises an air inlet in fluid communication with a source of air to be conditioned, a microemulsion inlet, a gas outlet, and a liquid outlet. The system includes a heat exchanger for used microemulsion from the water absorption vessel. The heat exchanger for used microemulsion comprises a heat absorption side inlet in fluid communication with the water absorption vessel liquid outlet and a heat absorption side outlet. The system also includes a water desorption vessel. The water desorption comprises an inlet in fluid communication with the microemulsion heat exchanger heat absorption side outlet, a water outlet, and a microemulsion outlet. The system also includes a microemulsion regenerator for thermal regeneration of microemulsion from the water desorption vessel. The microemulsion regenerator comprises a regenerator inlet in fluid communication with the water desorption vessel microemulsion outlet, and a regenerator outlet in fluid communication with the water absorption vessel microemulsion inlet. The system also includes a vapor compression cooling system comprising a refrigerant in thermal communication with the conditioned space, wherein the refrigerant is also in thermal communication with the microemulsion. In some embodiments, the air conditioning system optionally further a comprises a regenerated microemulsion heat exchanger comprising a heat rejection side inlet in fluid communication with the microemulsion regenerator outlet and a heat rejection side outlet in fluid communication with the water absorption vessel microemulsion inlet, wherein the vapor compression heat transfer system comprises an evaporator as a heat absorption side of the regenerated microemulsion heat exchanger.

In any of the foregoing embodiments, the vapor compression heat transfer system can comprise a condenser as a heat rejection side of the used microemulsion heat exchanger.

In any of the foregoing embodiments, the vapor compression heat transfer system can comprise an evaporator as a cooling source for the microemulsion regenerator.

In any of the foregoing embodiments, a heat exchanger of the vapor compression heat transfer system comprises a heat rejection side inlet in fluid communication with the conditioned air from the phase separator gas outlet, and a heat rejection side outlet in fluid communication with the conditioned space.

In any of the foregoing embodiments, cooled air from the vapor compression heat transfer system is mixed with the conditioned air from the phase separator gas outlet and provided to the conditioned space.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

It has been discovered that the energy and system component requirements on VCC systems for excess cooling to handle the latent cooling load and then reheat the air being conditioned can create inefficiency in the air conditioning process and system. Additionally, water condensation on metallic heat exchanger coils can cause corrosion problems, further adding to system design and fabrication costs as well as requiring additional system. Alternate humidity removal approaches such as desiccant wheels loaded with a solid desiccant positioned downstream of a temperature control unit can be space-consuming, and significant thermal energy is typically required to regenerate the desiccant, leading to efficiency reductions. Moreover, because the desiccant wheel is relatively cumbersome and not easy to install or uninstall, the capacity and operation of the systems based on desiccant wheels are generally not modular enough to accommodate a wide range of operations. Liquid desiccant systems can avoid some of the physical configuration limitations imposed by solid desiccant systems by providing the capability to move the liquid desiccant through a flow loop. However, liquid desiccants (e.g., lithium chloride) can be highly corrosive or toxic, or both, further adding to system design complexity, system cost, and fabrication costs as well as requiring additional system maintenance. Also, as with solid desiccants, significant heat energy is typically required to regenerate the desiccant, reducing system efficiency.

Figure 1:
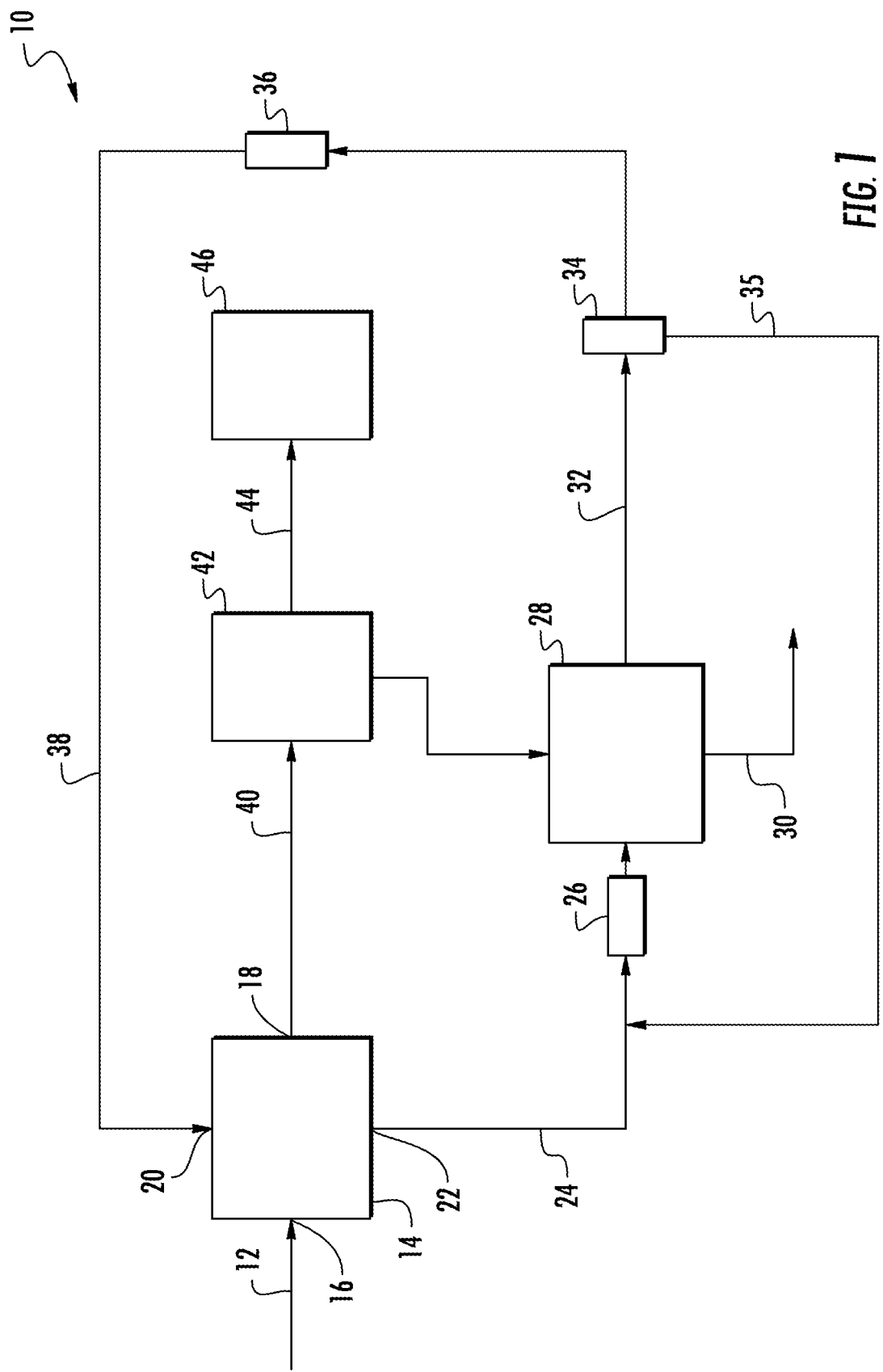
FIG. 1 is a schematic depiction of an example embodiment of a microemulsion-based moisture separation system.
Figure 2:
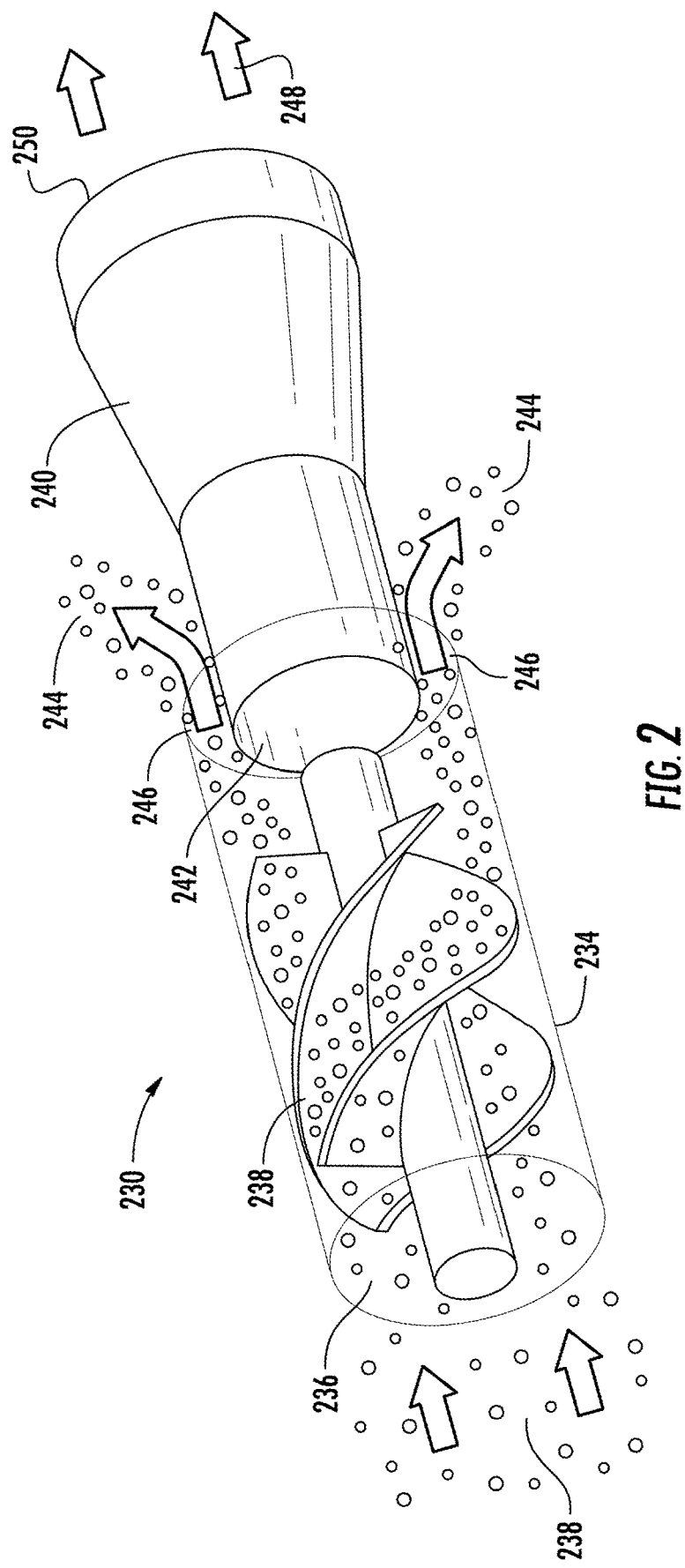
FIG. 2 is a schematic depiction of a centrifugal separator.

With reference now to FIG. 1, a schematic depiction of an example embodiment of a moisture separation system 10 that can be used for conditioning air is shown. As shown in FIG. 1, an inlet gas 12 (e.g., air such as warm humid air or ambient outdoor air) is introduced to a water absorption vessel 14. In some embodiments, the gas 12 can have humidity levels as high as 90%. The water absorption vessel includes a gas inlet 16, a gas outlet 18, a microemulsion inlet 20, and a liquid outlet 22. In some embodiments, the adsorption vessel includes a bed or packing structure (not shown) to facilitate or enhance interfacial contact area between the gas 12 and the microemulsion. In some embodiments, the bed or packing structure can be configured in counter-flow configuration, for example as a vertical tower configuration with the microemulsion flowing in a downward direction through the bed with assistance from gravity and the gas flowing in an upward direction driven by a pressure differential between the gas inlet and the gas outlet. In some embodiments, the bed or packing structure can be configured in a cross-flow configuration, for example, with the microemulsion flowing in a downward direction through the bed with assistance from gravity and the gas flowing horizontally across the bed.

The microemulsion can comprise inverse micelles of an amphiphilic surfactant in a non-polar non-volatile organic compound such as an oil (including oil blends). In some embodiments, the oil has a boiling point greater than about 100° C. at 100 kPa. In some embodiments, at least 70% of the atoms in the oil's molecular structure are carbon or hydrogen. In some embodiments, the oil can comprise at least one polyalphaolefin. When the surfactant concentration in the oil/surfactant mixture exceeds the critical micelle concentration ("CMC"), the surfactant molecules form inverse micelles via spontaneous self-assembly in the oil. The CMC can be defined as the concentration of surfactants above which micelles or inverse micelles form. The CMC can be determined by measuring the surface tension of the oil/surfactant mixture. At surfactant concentration levels below the CMC, the surface tension varies with surfactant concentration. At surfactant concentration levels above the CMC, the surface tension exhibits small to no levels of change with surfactant concentration. Small angle neutron scattering can also be used to measure the configuration or structure of micelles in the liquid to determine whether the CMC has been reached. The precise value of the CMC can vary with temperature, pressure, and the presence and concentration of other surface active substances. For example, the value of CMC for sodium dodecyl sulfate in water at 25° C. and atmospheric pressure is 0.008 moles/liter in the absence of other additives or salts.

Amphiphilic surfactants include hydrophobic and hydrophilic groups disposed on separate portions of a molecule, such as on opposite ends of the molecule. In certain embodiments, the at least one surfactant may comprise at least one of organosulfate salts, sulfonate salts or anhydride amino esters. In some embodiments, the at least one surfactant can comprise at least one of organosulfate salts, sulfonate salts or anhydride amino esters. Examples of surfactant include but are not limited to sodium dodecyl sulfate or dioctyl sodium sulfosuccinate. In the microemulsion, the hydrophobic group of the surfactant molecule is disposed outwardly with respect to the micelle, in contact with the surrounding oil. The hydrophilic group of the surfactant molecule is disposed inwardly with respect to the micelle. The hydrophilic groups of the surfactant molecule have a physiochemical affinity for water molecules, and can therefore adsorb water vapor into the inner surface of the inverse micelle, sequestering the water within each inverse micelle.

Figure 3:
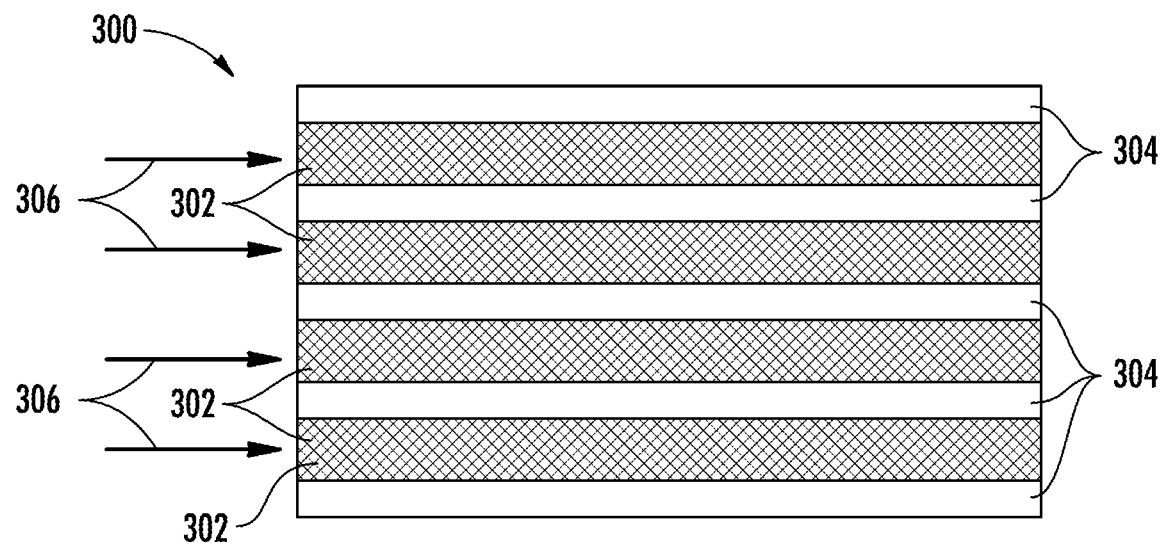
FIG. 3 is a schematic depiction of a liquid droplet capture separator.
Figure 4:
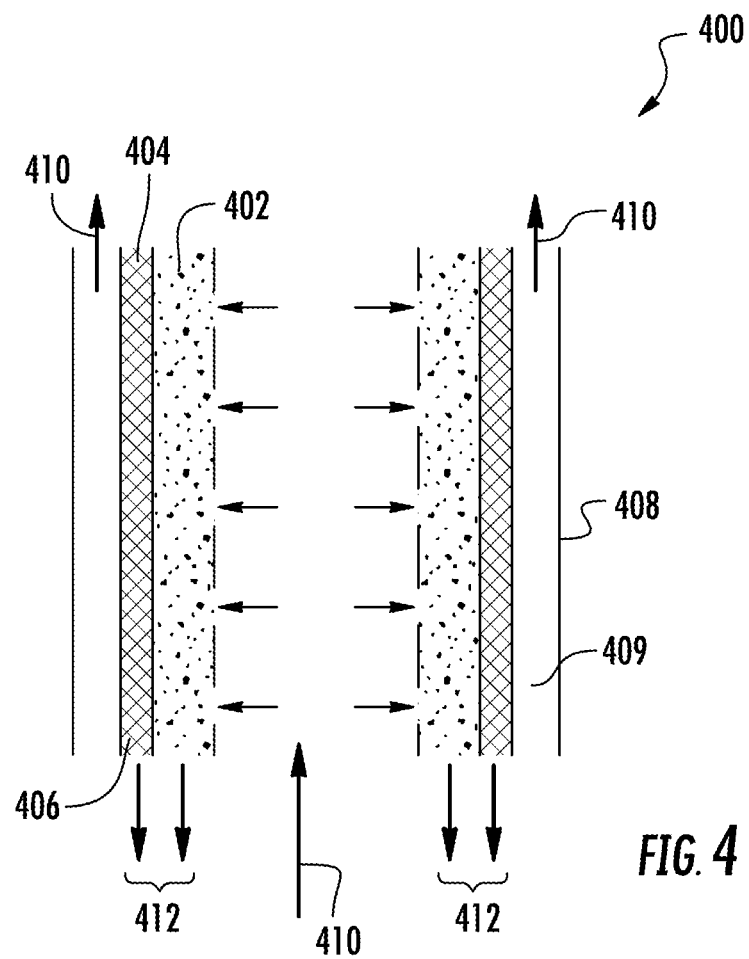
FIG. 4 is a schematic depiction of a liquid micro-droplet coalescing medium.
Figure 5:
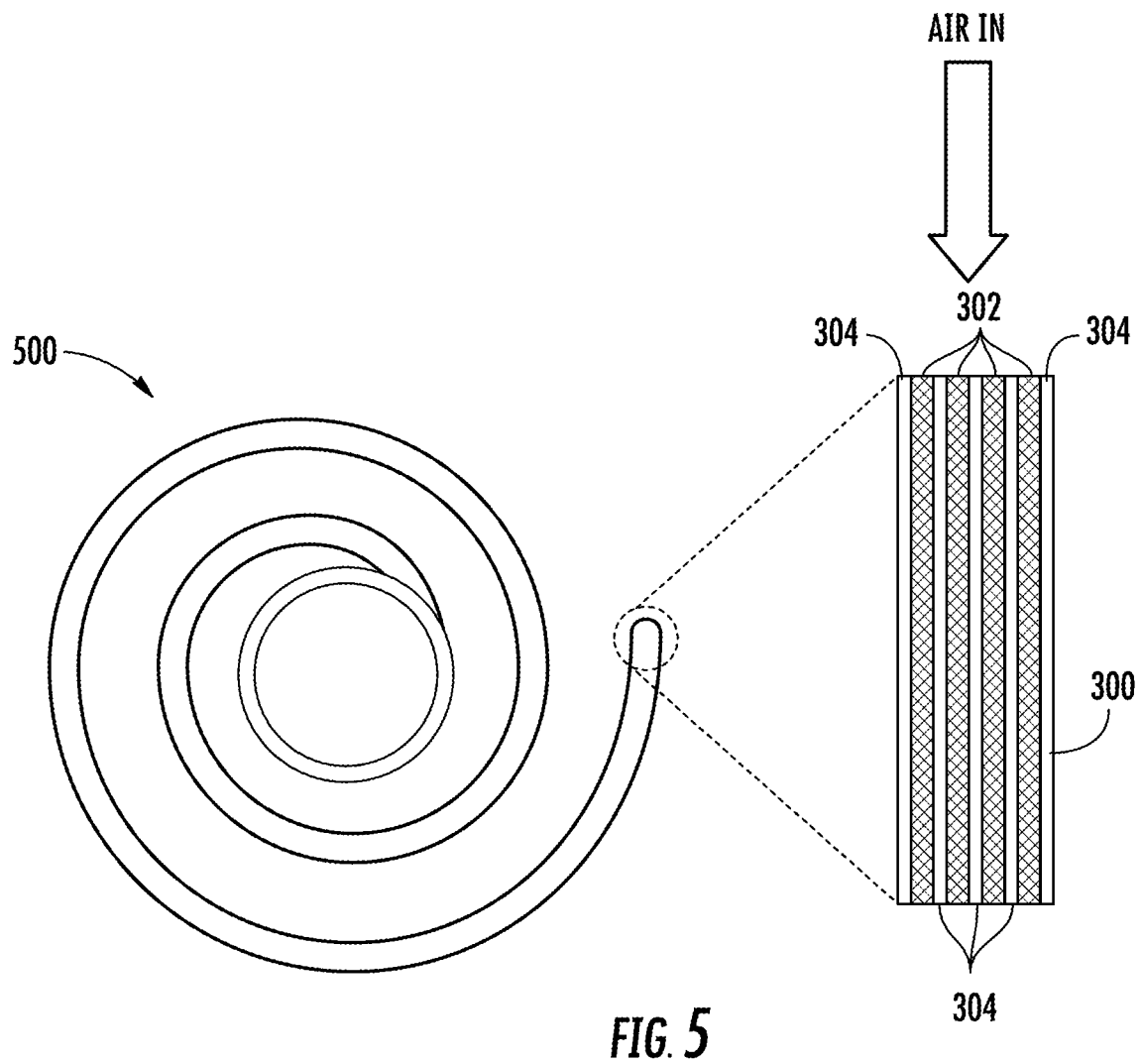
FIG. 5 is a schematic depiction of a multi-feature separator.

With continued reference to FIG. 1, dehumidified gas may contain entrained residue of the microemulsion, and is passed through conduit 40 to a gas-liquid phase separator 42 for separating gas from entrained liquid. In some embodiments, the gas-liquid phase separator has a pressure differential between inlet and gas outlet (i.e., dP or ΔP) of less than or equal 50% of the pressure at the gas-liquid phase separator inlet. In some embodiments, the gas-liquid phase separator has a dP of less than or equal to 10% of the pressure at the gas-liquid phase separator inlet. In some embodiments, the gas-liquid phase separator has a dP of less than or equal 2% of the pressure at the gas-liquid phase separator inlet. After entrained liquid is removed from the gas by phase separator 42, it can pass through conduit 44 to an end use 46 such as a building interior conditioned space. The phase separator 42 can be a single device or it can be multiple devices in series or parallel. In some embodiments, the phase separator includes a centrifugal separator, which can be used for separating relatively large droplets (e.g., of sizes 10 μm to 100 μm). An example embodiment of a centrifugal separator is schematically depicted in FIG. 2. A single centrifugal separator 230 is schematically depicted in FIG. 2. As shown in FIG. 2, the centrifugal separator 230 comprises a tubular body portion 234 having an inlet 236. Gas 238 enters the tubular body portion 234 through inlet 236, and encounters a deflector 238 that imparts a whirling or vortex motion to the gas as it travels through the tubular body portion 234. Centrifugal force from this motion causes droplets suspended in the gas flow to be directed toward the inside walls of tubular body portion 234. Outlet portion 240 has a receiving portion 242 having a narrower internal diameter than that of tubular body portion 234 such that when the gas flow encounters the outlet portion 240, the droplet-laden gas 244 near the inner walls of tubular body portion 234 exits through gas outlet 246 (from where it can be directed for example to used microemulsion heat exchanger 26) while the relatively cleaner gas 248 farther away from the inner walls of tubular body portion 234 exits through clean gas outlet 250.

In some embodiments, the phase separator 42 can include a liquid droplet capture medium. In some embodiments, the liquid droplet capture medium can be a stand-alone phase separator. In some embodiments, the liquid droplet capture medium can be disposed in a separate device in series downstream from a centrifugal phase separator to capture smaller droplets (e.g., sized in the 10 μm to 100 μm range, but optionally including capture of droplets smaller than those captured by the centrifugal separator 230 (FIG. 2)) still retained, although it can also capture larger droplets of the size handled by centrifugal separator, although perhaps with less efficiency. In some embodiments, the liquid droplet capture medium can be integrated with a centrifugal separator as described in more detail below (FIG. 5). Examples of liquid droplet capture media include but are not limited to a mesh pad or screen (e.g., mesh size of 0.1 μm to 10 μm), of plastic, metal, or other suitable material. In some embodiments, the filter capture medium can be disposed as multiple mesh pads separated by barrier layers in multiple. An example embodiment of a phase separator 300 utilizing a liquid droplet capture medium is depicted in FIG. 3, where mesh pads 302 are separated by barrier layers 304. As air 306 enters the mesh pads 302, liquid droplets impinge on the body of the mesh pads 302 and are drip down aided by gravity onto the surfaces of the barrier layers 304. Collection ports (not shown) along the periphery of the barrier layers 304 collect the liquid, from which it can be returned for example to the used microemulsion heat exchanger 26.

In some embodiments, the phase separator 42 can include a liquid micro-droplet coalescing medium. In some embodiments, the liquid micro-droplet coalescing medium can be a stand-alone phase separator (i.e., a coalescer). In some embodiments, the liquid droplet capture medium can be disposed in a separate device (i.e., a coalesce) in series downstream from a centrifugal phase separator and a liquid droplet capture medium to coalesce even smaller droplets (e.g., sized in the 10 μm to 100 μm range, but optionally including capture of droplets smaller than those captured by the phase separator 300 (FIG. 3)) still retained, although it can also capture larger droplets of the size handled by centrifugal separator and liquid droplet capture medium, although perhaps with less efficiency. An example embodiment of a coalescer 400 is schematically depicted in FIG. 4. As shown in FIG. 4, the coalesce 400 is constructed of an inner rigid open mesh core 402 (e.g., stainless steel) around which a glass fiber coalescing medium 404 (e.g., borosilicate glass fiber) is disposed. In some embodiments, the coalescing medium has a gradient pore structure by using layers of increasing pore size. The inlet gas first encounters the smallest pores, which increase with penetration distance to allow more space as the coalesced droplets grow. The coalescing medium 404 is supported by a mesh structure to provide mechanical strength which is then followed by a coarse outer wrap 406 that serves as a drainage zone, and is separated from outer housing 408 by an annular space 409. In some embodiments, the coalescing medium 404 is treated with a surface energy modifier such as an aqueous fluorocarbon emulsion to reduce surface energy and prevent the liquid from wetting the coalescing medium. In operation, gas 410 enters at the bottom of the housing and travels upward through the tube where it flows radially from the inside of the cartridges through the coalescing medium 404 to the annular space 409. Liquid micro-droplets coalesce to larger droplets on the coalescing medium 404, and the larger coalesced droplets drain through the coalescing medium 404 and outer wrap 406 as liquid 412, where collection ports (not shown) can transport the liquid to elsewhere in the microemulsion loop, for example to the used microemulsion heat exchanger 26.

In some embodiments, multiple types of phase separation technologies can be combined into a single device. An example of such an embodiment is schematically depicted in FIG. 5, where the multi-layer liquid droplet capture medium structure 300 (FIG. 3) is configured into a descending spiral structure 500. As gas 306 enters the structure 300, droplets will coalesce and/or be captured on the medium 302, while also being driven toward the barrier layers 304 by centrifugal force induced by the direction of flow along the descending spiral structure 500. Aided by gravity, the liquid will drain along the barrier layers 304 to the bottom of the spiral structure 500 where it can be collected for transportation to elsewhere in the microemulsion loop, for example to the used microemulsion heat exchanger 26.

In some embodiments, the water absorption vessel 14 (FIG. 1) can be operated in a batch mode or semi-batch mode, for example in which microemulsion is charged to the water absorption vessel and gas is processed through the water absorption vessel for separation of moisture from the gas. After completion of the batch processing, the microemulsion can be removed from the vessel and replaced with fresh microemulsion. In some embodiments, the water absorption vessel 14 can be operated in a continuous mode, for example in which microemulsion is continuously introduced to a microemulsion inlet of the water absorption vessel 14 and used water-containing microemulsion is continuously removed through a liquid outlet of the water absorption vessel 14. In some embodiments, the used microemulsion can be simply discarded, used in another process, or collected for later processing or regeneration. In some embodiments, as shown in FIG. 1, the used microemulsion can be processed and recycled back to the water absorption through a microemulsion flow loop that removes used microemulsion (i.e., microemulsion with absorbed water disposed within inverse micelles) from the water absorption vessel 14 for regeneration and re-use. As shown in FIG. 1, used microemulsion flows through conduit 24 to a heat absorption side of a used microemulsion heat exchanger 26, where it is heated (e.g., to a temperature of at 70° C. to 90° C.) and passed to water desorption vessel 28. At low temperatures (such as room temperature), the hydrophilic groups of the surfactant molecules provide sequestration of water within the inverse micelles. As temperature increases from heat absorbed in used microemulsion heat exchanger 26, the inverse micelles dissociate, thereby releasing the water. If the temperature required to dissociate the inverse micelles is lower than the boiling point of water, it will be released as a liquid. Water released from the inverse micelles will coalesce and separate from the oil/surfactant solution (also referred to herein as a "microemulsion", albeit in non-emulsified form) in the water desorption vessel 28, where it is removed through water outlet 30.

From water desorption vessel 28, the mixture of oil and surfactant pass through conduit 32 to microemulsion regenerator 34, where the mixture is cooled (e.g., to a temperature of at 50° C. to 60° C.) to spontaneously regenerate the inverse micelles of the microemulsion. Any device capable of cooling the mixture to regenerate the microemulsion (e.g., a chiller or heat rejection side of a heat exchanger) can serve as the microemulsion regenerator 34. A portion of the regenerated microemulsion (e.g., 15-20 wt. %) can optionally be recycled to the inlet of heat exchanger 26 through conduit 35 to enhance separation of water from the used microemulsion in water desorption vessel 28. In some embodiments, the regenerated microemulsion can be further cooled in regenerated microemulsion heat exchanger 36 before returning through conduit 38 to the water absorption vessel 14.

In some embodiments, a microemulsion-based moisture/gas separation system such as an air conditioning system (either with or without a gas-liquid phase separator) can be integrated with a vapor compression cooling (VCC) system such as a system comprising a compressor, a condenser, an expansion device, and an evaporator, connected together by a refrigerant flow loop. In some such embodiments, a microemulsion-based air conditioning system provides dehumidification of air and takes on latent cooling loads, while sensible cooling is provided the VCC system in thermal communication with the conditioned space. Although it is not required or necessarily achieved in all embodiments, in some embodiments, this can provide the technical effect of avoiding or reducing the need for supercooling and reheating of conditioned air by the VCC system and provide increased overall system efficiency. For example, in the example embodiment depicted in FIG. 1, air conditioning system 10 can provide ventilation air into a conditioned space (end use 46), while a VCC system (not shown) provides cooling for the thermal load generated by the conditioned space, e.g., heat from lights, equipment, solar energy absorption, personnel.

Figure 6:
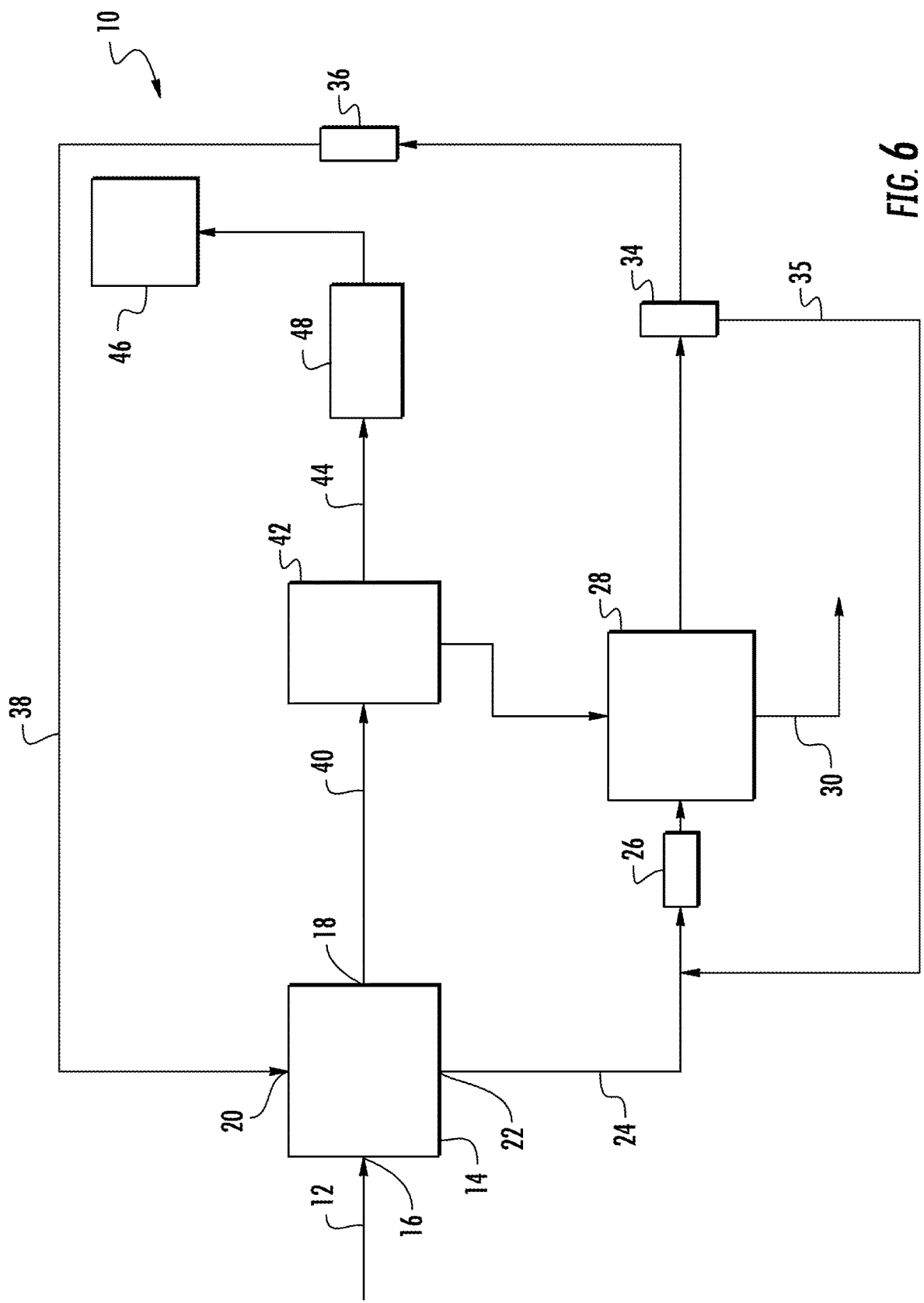
FIG. 6 is a schematic depiction of an example embodiment of an air conditioning system utilizing a microemulsion and vapor compression heat transfer.
Figure 7:
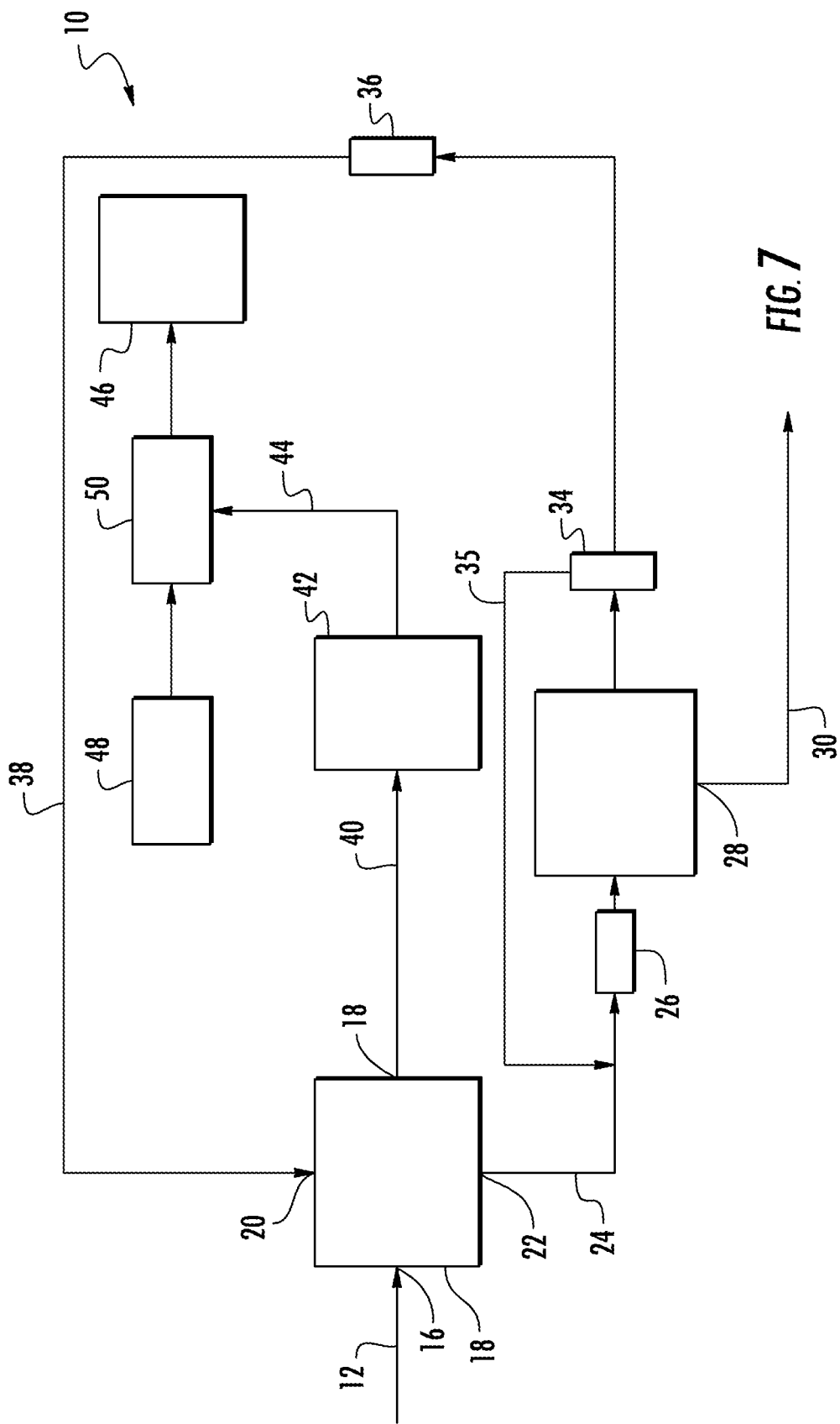
FIG. 7 is a schematic depiction of another example embodiment of an air conditioning system utilizing a microemulsion and vapor compression heat transfer.
Figure 8:
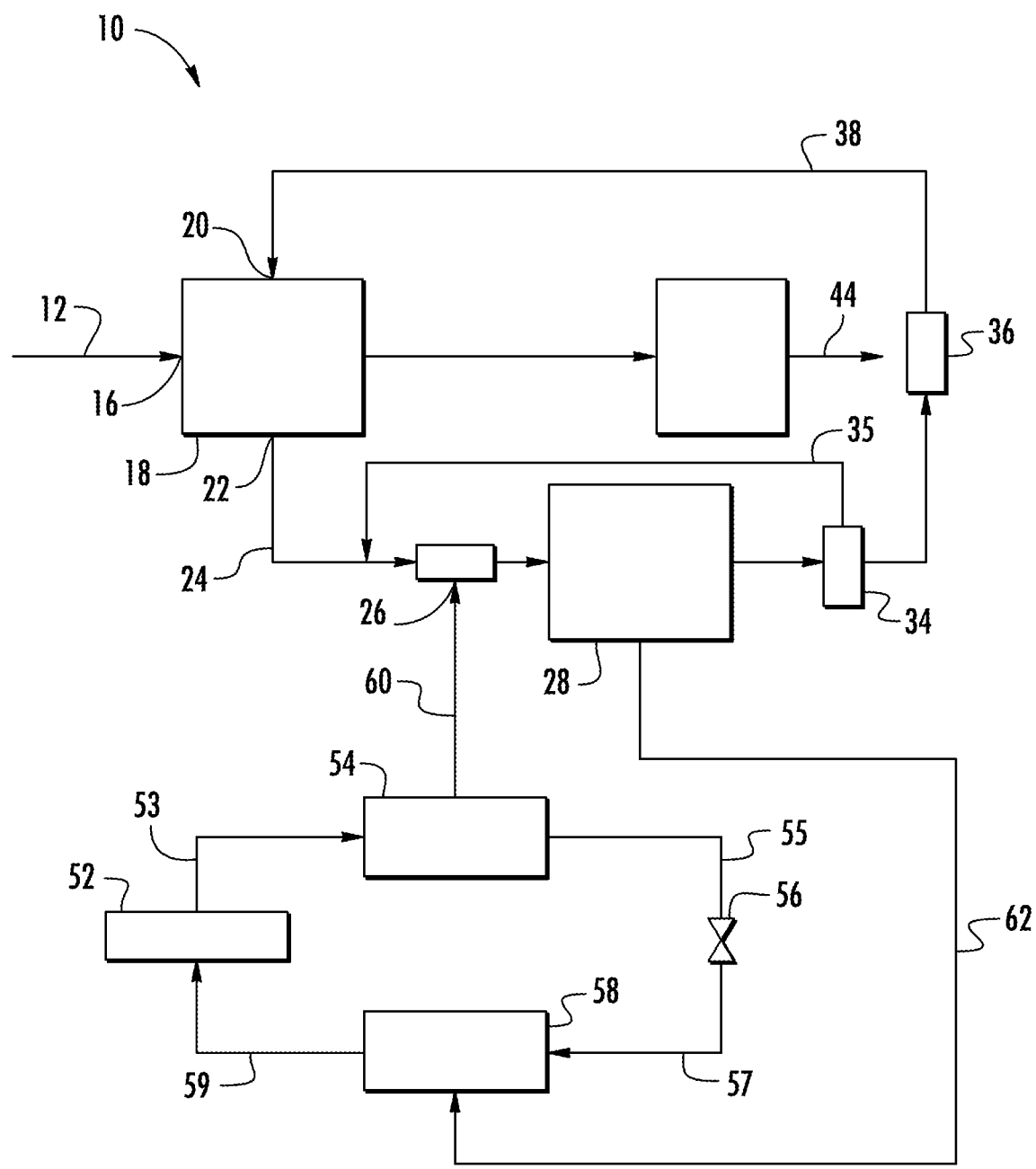
FIG. 8 is a schematic depiction of another example embodiment of an air conditioning system utilizing a microemulsion and vapor compression heat transfer.

Other examples of embodiments of air conditioning systems are schematically depicted in FIGS. 6-8, where numbering from FIG. 1 is repeated for the same elements and features, the description of which is not repeated below. In FIG. 6, an example embodiment is schematically depicted where conditioned air in conduit 44 is provided as input air to an evaporator (not shown) in a VCC system 48, which outputs conditioned air to the conditioned space (end use 46). In some embodiments, the already-dehumidified air in conduit 44 does not require further dehumidification, so the VCC system 48 does not have to supercool the air for moisture removal followed by re-heating. In FIG. 7, an example embodiment is schematically depicted where conditioned air in conduit 44 is mixed in mixer 50 with output air from an evaporator (not shown) in a VCC system 48, and the mixed air is delivered to the conditioned space (end use 46). In some embodiments, ambient air humidity may be low enough that even if the VCC system 48 is operated without supercooling the air for moisture removal so that output air from the VCC system evaporator has a moderate level of humidity, the humidity of the air in conduit 44 will be low enough that the blended air delivered from the mixer 50 to the conditioned space will be acceptable.

In some embodiments, a VCC system can be integrated with its refrigerant in thermal communication with the microemulsion loop of the system 10 to deliver or remove heat from the microemulsion loop, which can promote system energy efficiency. An example of an embodiment of an integrated heat transfer system with a refrigerant circulation loop is shown in block diagram form in FIG. 8. As shown in FIG. 8, a compressor 52 pressurizes refrigerant in its gaseous state, which both heats the fluid and provides pressure to circulate it throughout the system. The hot pressurized gaseous refrigerant exiting from the compressor 52 flows through conduit 53 to condenser 54, which functions as a heat exchanger to transfer heat from the refrigerant to a heat sink, resulting in condensation of the hot gaseous refrigerant to a pressurized moderate temperature liquid. The liquid refrigerant exiting from the condenser 54 flows through conduit 55 to expansion device (e.g., an expansion valve) 56, where the pressure is reduced. The reduced pressure liquid refrigerant exiting the expansion valve 56 flows through conduit 57 to evaporator 58, which functions as a heat exchanger to absorb heat from a heat source and boil the refrigerant. Gaseous refrigerant exiting the evaporator 58 flows through conduit 59 to the compressor 52, thus completing the refrigerant loop.

Typically, the condenser 54 is disposed outdoors with heat rejected to the ambient environment, and the evaporator 58 is disposed indoors so that heat is absorbed from a conditioned space. In the embodiment shown in FIG. 8, heat from the VCC system can be transferred to the heat absorption side of the used microemulsion heat exchanger 26 along thermal flow path 60. Thermal flow path 60 is of course conceptual in its depiction, and the heat transfer would actually be effected by routing refrigerant from the VCC refrigerant loop to the heat rejection side of the heat exchanger 26, which would essentially function as a condenser for the VCC system. According to another feature shown in FIG. 8, cooling to regenerate the microemulsion and/or further cooling of the regenerated microemulsion can be accomplished by transferring heat from the microemulsion regenerator 34 and/or the heat rejection side of the regenerated microemulsion heat exchanger 36 to the VCC system along thermal flow path 62. Thermal flow path 62 is of course conceptual in its depiction, and the heat transfer would actually be effected by routing refrigerant from the VCC refrigerant loop to the heat absorption side of the microemulsion regenerator 34 and/or the heat exchanger 36, which would essentially function as evaporator(s) for the VCC system. The heat transfer along thermal flow paths 60 and 62 can be accomplished performed by a single VCC system or by multiple VCC systems, and can represent all or part of the thermal loads on the VCC system(s) involved. For example, a single VCC system could provide cooling for the conditioned space (end use 46) with a primary evaporator 58, with the heat absorption side of the microemulsion regenerator 34 and/or the heat exchanger 36 functioning as secondary evaporator(s). Accordingly, for ease of illustration, FIG. 8 does not depict conditioned space or the specifics of how the air conditioning system 10 or the VCC system could interact with it, as example embodiments of such details are already shown in FIGS. 1, 6, and 7.

It should be noted that the various vessels, components, structures, and functions disclosed herein as discrete vessels, components or structures, and functions can be integrated together within the scope of this disclosure. For example, the used microemulsion heat exchanger 26 and the water desorption vessel 28 are depicted in FIG. 1 as separate structures, but this is merely an illustrative example embodiment and they can also be integrated into a single structure where the used microemulsion is heated and water removed. Similarly, the microemulsion regenerator 34 and the heat exchanger 36 can be integrated into a single structure where the oil/surfactant mixture is cooled to regenerate the microemulsion and then further cooled below the While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A moisture separation system, comprising
   a water absorption vessel comprising a microemulsion disposed therein, the water absorption vessel further comprising a gas inlet in fluid communication with a gas source of a gas comprising moisture to be removed and a gas outlet;
   a gas-liquid phase separator comprising an inlet in fluid communication with the water absorption vessel gas outlet, a gas outlet for dried gas, and a liquid outlet;
   a used microemulsion heat exchanger comprising a heat absorption side inlet in fluid communication with a liquid outlet of the water absorption vessel, and a heat absorption side outlet;
   a water desorption vessel comprising an inlet in fluid communication with the used microemulsion heat exchanger heat absorption side outlet, a water outlet, and a microemulsion outlet; and
   a microemulsion regenerator for thermal regeneration of microemulsion from the water desorption vessel, comprising a regenerator inlet in fluid communication with the water desorption vessel microemulsion outlet, and a regenerator outlet in fluid communication with a microemulsion inlet of the water absorption vessel.

2. The system of claim 1, wherein the phase separator comprises a centrifugal phase separator.

3. The system of claim 1, wherein the phase separator comprises a liquid droplet capture medium.

4. The system of claim 3, wherein the liquid droplet capture medium comprises a mesh pad with a mesh size of 0.1 µm to 10 µm.

5. The system of claim 3, wherein the liquid droplet capture medium comprises a plurality of mesh pads separated by barrier layers.

6. The system of claim 1, wherein the phase separator comprises a liquid micro-droplet coalescing medium.

7. The system of claim 6, wherein the liquid micro-droplet coalescing medium comprises a micro-fiber filter medium with a mesh size of 0.1 µm to 10 µm.

8. The system of claim 1, wherein pressure at the gas outlet of the gas-liquid phase separator during operation differs from pressure at the inlet of the gas-liquid phase separator by less than or equal to 50% of the pressure at the inlet of the gas-liquid phase separator.

9. The system of claim 1, wherein the gas comprising moisture to be removed is outside air, and the gas outlet of the gas-liquid phase separator is in fluid communication with a conditioned space.

10. The system of claim 9, further comprising a vapor compression cooling system comprising a refrigerant in thermal communication with the conditioned space.

11. The system of claim 10, wherein the refrigerant is also in thermal communication with the microemulsion.

12. An air conditioning system, comprising
    a water absorption vessel comprising a microemulsion disposed therein, the water absorption vessel further comprising an air inlet in fluid communication with a source of air to be conditioned, a microemulsion inlet, a gas outlet in fluid communication with a conditioned space, and a liquid outlet;
    a used microemulsion heat exchanger comprising a heat absorption side inlet in fluid communication with the water absorption vessel liquid outlet and a heat absorption side outlet;

a water desorption vessel comprising an inlet in fluid communication with the microemulsion heat exchanger heat absorption side outlet, a water outlet, and a microemulsion outlet;

a microemulsion regenerator for thermal regeneration of microemulsion from the water desorption vessel, comprising a regenerator inlet in fluid communication with the water desorption vessel microemulsion outlet, and a regenerator outlet in fluid communication with the water absorption vessel microemulsion inlet; and a vapor compression cooling system comprising a refrigerant in thermal communication with the conditioned space, wherein the refrigerant is also in thermal communication with the microemulsion.

13. The air conditioning system of claim 12, wherein the vapor compression cooling system comprises a condenser as a heat rejection side of the used microemulsion heat exchanger.

14. The air conditioning system of claim 12, wherein the vapor compression cooling system comprises an evaporator as a cooling source for the microemulsion regenerator.

15. The air conditioning system of claim 12, further comprising a regenerated microemulsion heat exchanger comprising a heat rejection side inlet in fluid communication with the microemulsion regenerator outlet and a heat rejection side outlet in fluid communication with water absorption vessel microemulsion inlet, wherein the vapor compression cooling system comprises an evaporator as a heat absorption side of the regenerated microemulsion heat exchanger.

16. The air conditioning system of claim 12, wherein an evaporator of the vapor compression cooling system comprises a heat absorption side inlet in fluid communication with the conditioned air from a phase separator gas outlet, and a heat absorption side outlet in fluid communication with the conditioned space.

17. The air conditioning system of claim 12, wherein cooled air from a heat absorption side of a heat exchanger of the vapor compression cooling system is mixed with the conditioned air from a phase separator gas outlet and provided to the conditioned space.

18. A method of separating moisture from a gas, comprising contacting the gas with a microemulsion to absorb water from the gas into the microemulsion, producing dehumidified gas and used microemulsion;

separating carried over microemulsion from the dried gas with a gas-liquid phase separator to produce dried gas;

heating the used microemulsion to form a modified used microemulsion and non-emulsified water;

separating non-emulsified water from the modified used microemulsion, and cooling the modified used microemulsion to form a regenerated microemulsion; and recycling the regenerated microemulsion for contact with the gas.

\* \* \* \* \*